UNITED STATES PATENT OFFICE.

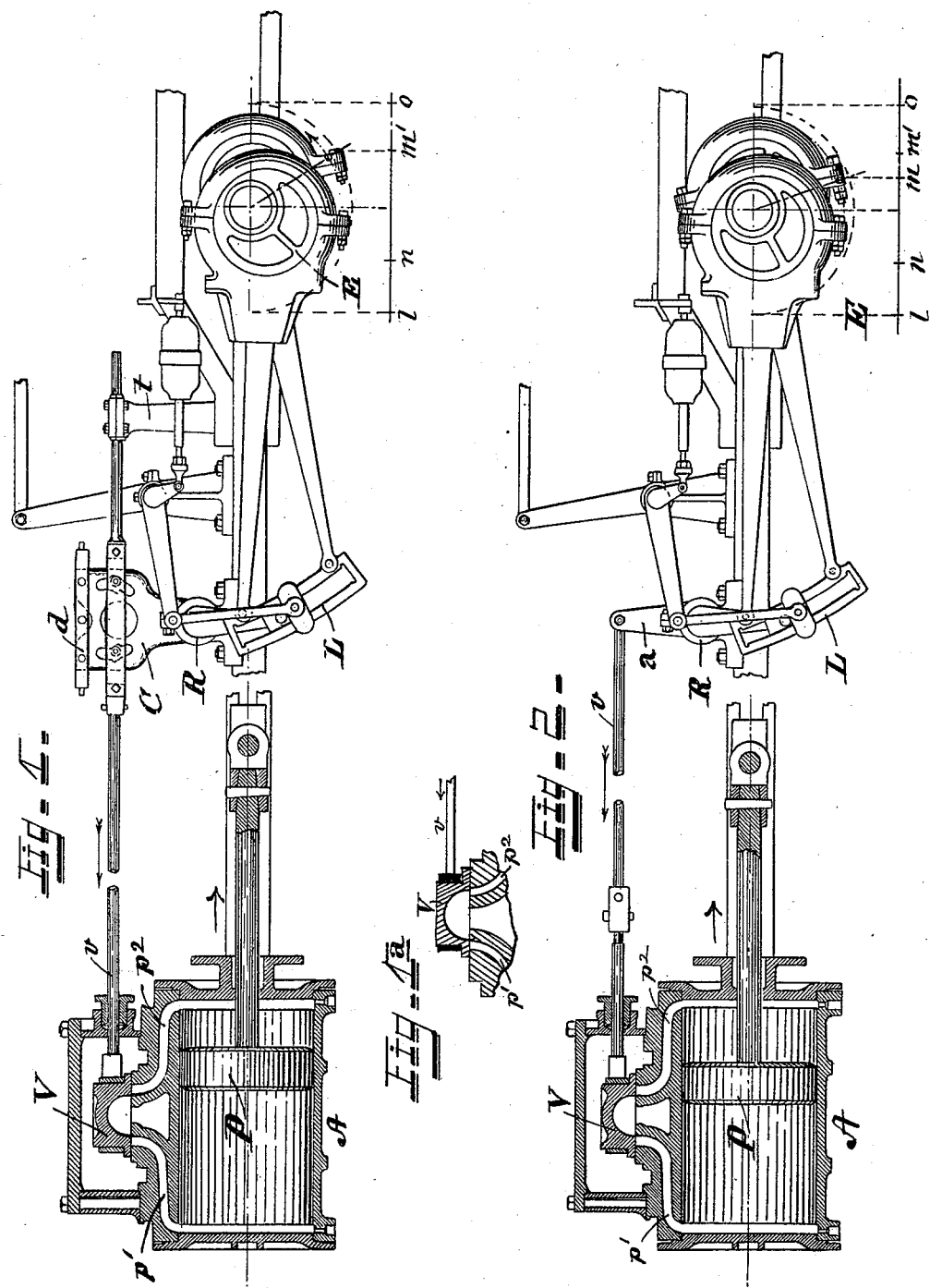

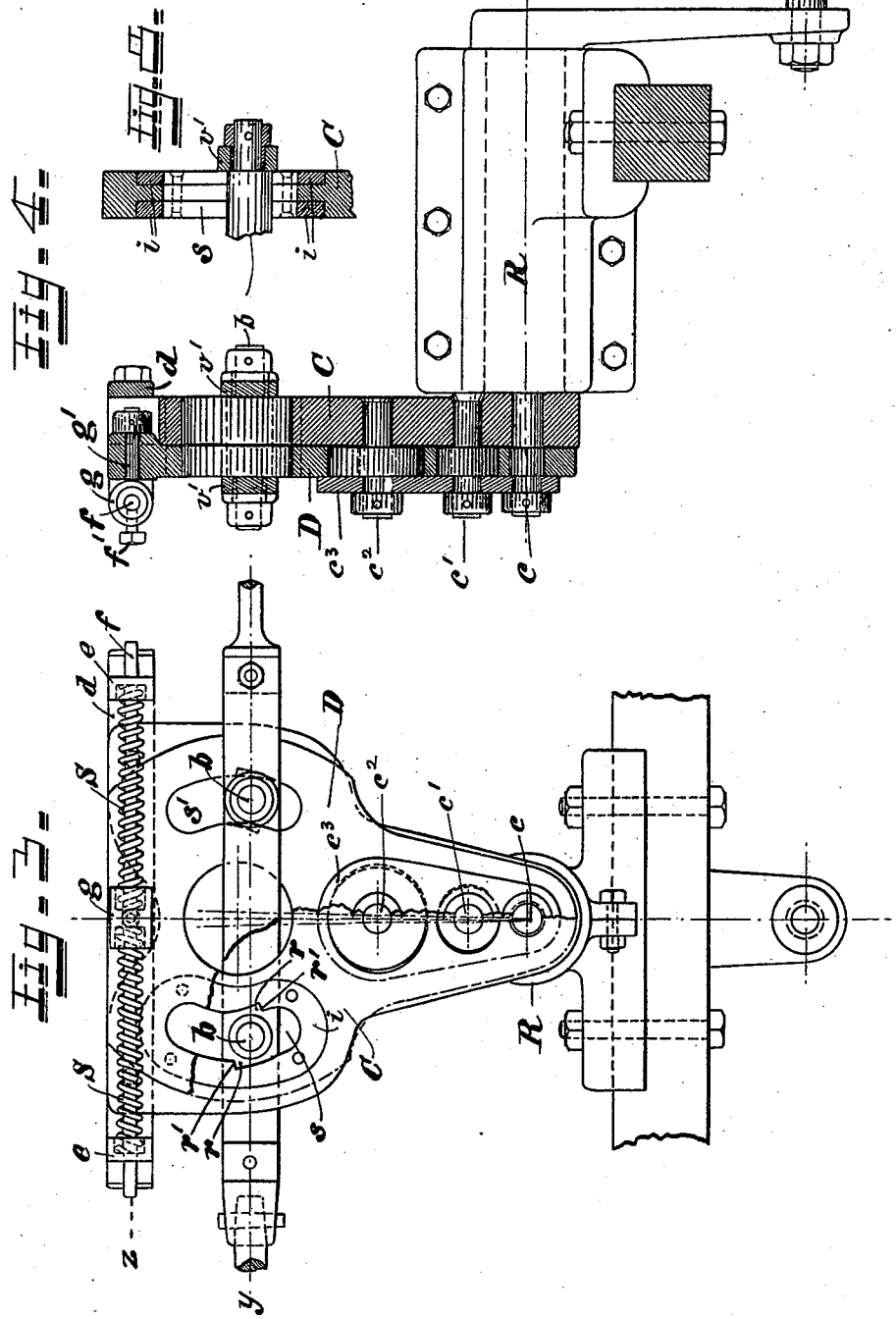

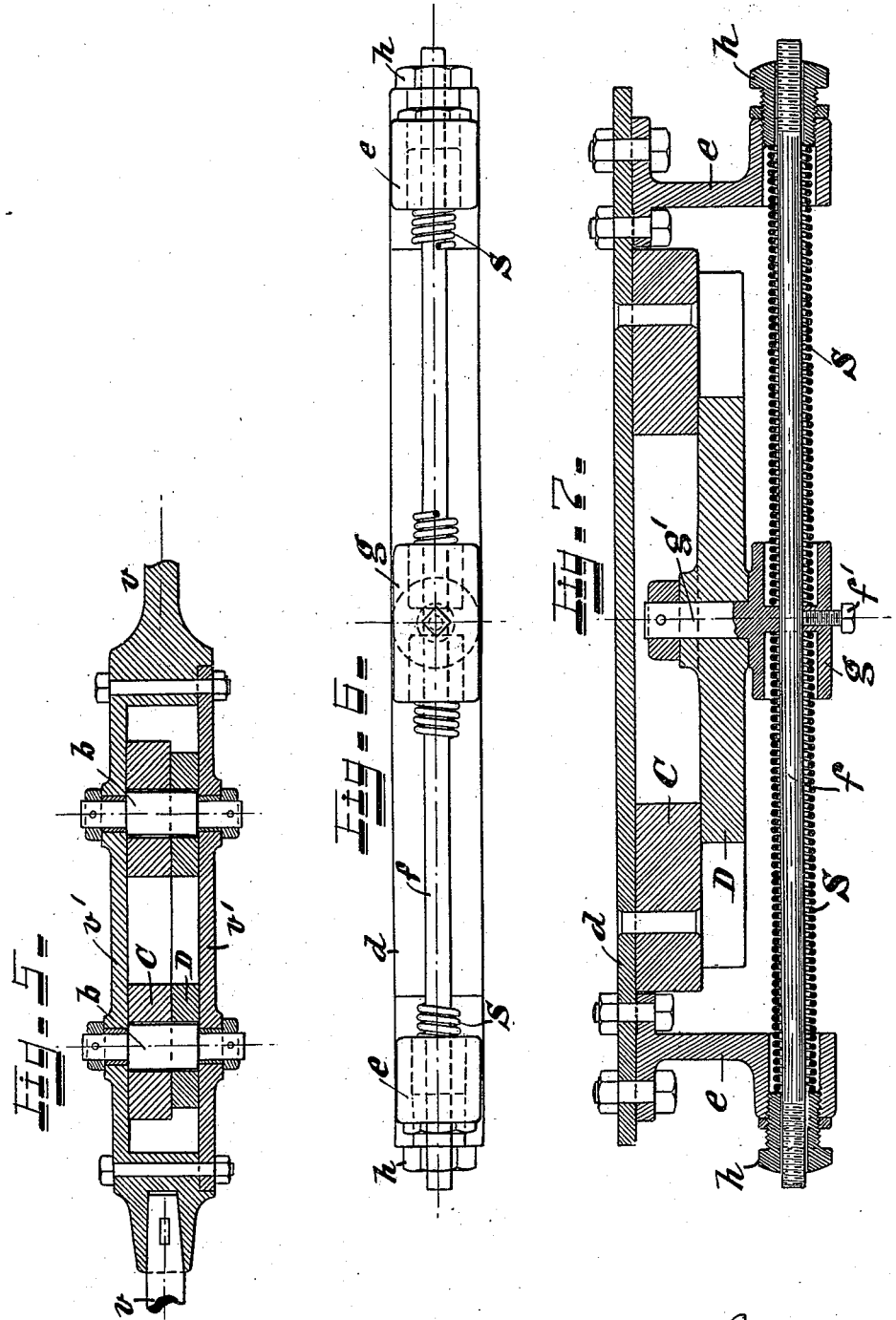

JEPTHA GARRARD AND WILLIAM W. LEWIS, OF CINCINNATI, OHIO.

VALVE-GEAR.

SPECIFICATION forming part of Letters Patent No. 510,128, dated December 5, 1893.

Application filed September 1, 1893. Serial No. 484,578. (No model.)

*To all whom it may concern:*

Be it known that we, JEPTHA GARRARD and WILLIAM W. LEWIS, citizens of the United States, residing at Cincinnati, Ohio, have jointly invented new and useful Improvements in Valve-Gear for Steam-Engines, of which the following is a specification.

Our invention relates to steam engines of the reciprocating type employing a slide-valve, and particularly to those constructed to operate in both rotative directions; as for example, locomotive engines of the prevailing standard. The conditions of such service necessitate the use of a valve with but little or no inside lap; so that release of steam at one side of the piston occurs at or very nearly at the same time with the beginning of compression at the other. To obtain the fullest return of power from the engine, these events should both be delayed as long as practicable in relation to the piston movement, in order that the acting steam may exert its force through as large an arc of the crank-circle as possible, and also that the back-pressure, due to compression of spent steam, may not occur until the crank-pin approaches the horizontal diameter connecting the "dead point" of the crank-circle, so as to minimize the resistance to the piston movement. In the use of the reversing link, however, as a variable expansion device, in operating the valve at shorter stroke to cut off steam-admission earlier in the piston-stroke and thus utilize its expansive quality, the release of the acting steam and compression of spent steam are also made to occur at proportionally earlier times; whereby, not only is the acting steam released before it has exhausted its capacity for useful work, but the compression at the opposite side of the piston is begun too soon and results in an excessive back-pressure counteracting the useful power of the engine. These defective conditions, moreover, arise at a point in the crank travel where the loss of propelling force and the detrimental effect of back-pressure are most effectively felt.

The object of our invention is to remedy this defect in the operative conditions of engines of this type, and incidentally to do so in the simplest and least expensive manner, and further, by means adaptable to existing structures without serious difficulties of application.

To this end, our invention consists in mechanism, introduced as an improvement in or attachment to the valve-operating gear of steam engines, having the function of delaying the movement of the valve at its point of travel where, having cut off the admission port, it approaches the point of opening the same port to the exhaust cavity; in order to prolong the time during which the steam is acting to propel the piston; and also, to delay correspondingly the closing of the opposite port to the spent steam exhausting from the opposite side of the piston, in order to delay and reduce compression.

It consists also of certain preferred features of construction, whereby these beneficial results are accomplished in a manner best adapted to the conditions of practical service.

It is a further beneficial incident of our invention, growing out of its constructive features, that the movement of the valve, immediately after the delay mentioned, is abnormally rapid so as to produce a "quick" opening for the subsequent admission of steam and a like quick opening to the exhaust.

Our invention is illustrated in the accompanying drawings representing the application to a slide-valve engine whose valve is operated by the "link motion."

In the drawings,—Figures 1, and 2, are similar side elevations of the same engine, with cylinder, valve-chest, and valve, sectioned to show relative positions of the piston and valve at the point of beginning compression, with our invention applied (as in Fig. 1) and without it (as in Fig. 2),—shown together for purposes of comparison; Fig. 1$^a$, a detail valve-section showing its position at the beginning of the retarding action contemplated by our invention. Fig. 3 is an enlarged side elevation of the rocker-arm-plates operating the valve-rod from the rock-shaft. Fig. 4, is a vertical axial section of the rocker-arm-plates showing their relation to the rock shaft. Fig. 5, is a horizontal cross section of the rocker-arm-plates and valve-rod-yoke, taken in the center axial plane, *x*, of Fig. 3. Fig. 6, is a front elevation of the spring-carrier shown in Fig. 1, but upon an enlarged scale to show details of construction. Fig. 7, is a horizontal plan section of the spring-carrier, upon a corresponding scale with the preceding figure, showing the rocker-arm-plates in section and the connections of the spring carrier therewith; and Fig. 8, is a detail longitudinal section through one of the operating slots of the rocker-arm-plates showing the construction of the reinforcing rings.

Referring now more particularly to the drawings: A, designates the cylinder of a steam-engine of the ordinary slide-valve reciprocating type; P, its piston; V, its distributing slide-valve; L, the link; and, E, the eccentric valve-mover. These parts are of ordinary construction and require no specific description; and we may further abridge the present specification by stating that all parts of the engine are of the usual form and construction, excepting that we substitute rocker-arm-plates, and parts immediately connected therewith, for the usual crank connecting the rock-shaft, R, with the valve-rod, v, and change the valve-rod construction to correspond,—all as hereinafter set forth.

The substitute for the ordinary crank-arm, a, (Fig. 2,) employed by us in carrying out our invention, consists of two plates, C, D, (Fig. 6,) of which the first, C, is rigidly affixed to the rock-shaft, R, and is, in fact, an enlargement of the crank, a, in its plane of oscillation. The plate, C, is provided, at opposite sides of its vertical axis, with curved slots, s, by which it has connection with the valve-rod, v, by means of two spindles, b, b, projecting from the valve-rod through the slots respectively. It may be explained at this point, that the valve-rod, v, is provided with an elongated yoke with parallel sides, v', embracing the plates, C, D, and carrying the spindles, b, through and between its sides, passing through the slots, s, of the plate, C, and corresponding slots in the auxiliary plate, D, (presently to be described,) and is prolonged beyond the yoke into a bearing-bracket t, in which it is guided in its reciprocation. The slots, s, are elongated vertically in curves so formed as to allow the oscillation of the plate, C, in relation to the horizontal movement of the valve-rod, v, and to reciprocate the latter by relative sliding movement of the spindles, b, in the slots whose walls (excepting as herein described) are parallel and spaced apart to admit the spindles in a close but easy rotating fit. Were the opposite walls of the slots continuously parallel throughout their length, the oscillation of the plate, C, would obviously reciprocate the valve-rod in substantially the same manner as would the old crank-arm, a, (Fig. 2) (pivotally connected directly to the valve-rod),—that is, uniformly in opposite directions. In order, however, to produce a variable movement of the valve by a pause in such movement at the point of travel, where, after the valve has closed the admission port at one side, so as to utilize the expansive quality of the steam against the piston, it is about to open it again to the exhaust, we form at the engaging side of each slot, s, ("engaging" in relation to the spindles, b, of the valve-rod according to the direction of the valve movement) an offset or recess, r, increasing the width of the slot at such point by an amount equal to the depth of the recess. The entrance side of the recess is formed as a direct radial offset, r', so that the spindle, b, in its relative travel at once ceases to engage the wall of the slot upon reaching the recess, and the valve-rod remains stationary, until—(the plate, C, continuing its movement), the spindle engages the bottom of the recess. The bottom wall of the recess being projected from the offset, r', outward upon a relative inclination, the valve, V, obtains thereby an increased velocity of travel immediately following its pause. The reverse movement of the plate, C, repeats in reverse, the pause of the valve, produced by the correspondingly oppositely formed recess, r, at the opposite side of the slot, at a corresponding position of the valve in relation to the opposite port. The results effected will be more clearly understood by a general recapitulation upon the basis of Figs. 1 and 2.

Confining our attention now to Fig. 2, suppose the valve, V, and the piston, P, to be in motion as indicated by the arrows; the valve has cut off admission of steam through the port, p', behind the piston, P, and, by a continuation of its movement is about to open the port again to exhaust the steam, and also has just closed the port, p², through which steam in front of the piston, P, has been exhausting, and now compression begins. The relative positions of these events in relation to the piston stroke, are shown upon a base line, l, o, connecting opposite tangents of the crank-pin circle, and representing the stroke of the piston between its extreme limits l, and o. The point of cut-off, n we may place at, say, one-fourth of the stroke (supposing the link to be moved closely to its center). In ordinary locomotive practice, the valve is formed with practically no inside lap, so that with the link elevated, the release of steam and the beginning of compression will take place at, m, a very short distance beyond the central point of the stroke, so that expansion is available only for about one quarter of the stroke.

Turning now to Fig. 1ª, and recalling the construction and effect of the recesses, r, in the slots, s, we will suppose that when the valve, V, has reached the position shown, having closed the port, p', before opening it to exhaust, and before closing the port, p², the spindles, b, (Fig. 3) in their relative travel in the slots, s, arrive at the offsets, r', and that the arm, C, continues its travel, leaving the valve stationary, until the spindles, b, reengage with the bottom of the recesses, r, and the valve is again moved (at an accelerated rate of travel) to the end of its stroke, so that the opening of port $p'$ to exhaust has thus been delayed, and the exhaust and compression point, $m$, (Fig. 2) thus shifted to $m'$ (Fig. 1). In other words, the period of steam-effect $l$, $m$, upon the piston has been prolonged to $l$, $m'$, thereby increasing the time of effective steam-pressure at the most favorable position of the crank, and at the same time decreasing the amount of compression or back pressure, and deferring it to that position of the crank where it offers least resistance to the propelling force of the engine. This delay of valve-movement, it will be observed, has no influence whatever upon the governing action of the valve in relation to the admission of steam; but its action and effect are confined exclusively to the exhaust function.

The remaining mechanism has reference to certain controlling and modifying functions necessary to adapt the device as a whole to practical service particularly in locomotive engines;—and to this end, the auxiliary plate, D, is in effect, a means for applying the regulating power of springs, S, S, for purposes to be adverted to later. The plate, D, is substantially similar in form to the plate, C, and is placed face to face upon it to oscillate upon it in a limited arc extending equally at both sides of the central vertical axis. It has a concentric pivotal engagement with the plate, C, upon a stud $c$ projecting from the latter in the axis of the rock-shaft, R, (Figs. 3, 4.) The plate D is provided with slots, $s'$, registering in exact correspondence with the slots, $s$, of the plate, C, but having their walls continuous and parallel without any recesses.

The regulating springs, S, S, are mounted and connected as follows: At the rear side and top of the primary plate, C, is attached a horizontal bar, $d$, extending slightly beyond the plate at each end, and seated upon these extensions and projecting forward are duplicate brackets, $e$, $e$, having their forward ends formed as sockets to contain and seat the outer ends of spiral springs, S, S, extended thence inwardly upon a rod, $f$, which is projected between and through both sockets. At its mid-length the rod, $f$, is carried through and secured by a pin or set screw, $f'$, to a double socket-piece, $g$, in which the corresponding inner ends of the springs, S, are seated. The socket-piece, $g$, is extended at one side into a pivotal stud, $g'$, passing into and through an engaging aperture of the auxiliary plate, D, where it may be secured in rotative connection by a washer and pin at the rear, or in any other convenient manner. The springs, S, are by this construction, made to bear inwardly in opposite directions upon the auxiliary plate, D, from fixed points of attachment (the brackets, $e$), upon the primary plate, C, and are normally set to bear with equal force and hold the auxiliary plate in such position relative to the primary plate that the slots, $s$ and $s'$, exactly register—and it will be seen that the independent oscillation of the auxiliary plate upon the primary plate in either direction is resisted by one or the other of the springs, S. It may now be explained that when the spindles, $b$, in their relative travel in the slots, $s$, reach the offsets, $r'$, and are about to pass radially into the recesses, $r$, this radial movement is resisted by the plates, D, whose slots, $s'$, have no such recesses, and such movement would therefore be impossible except for the pivotal mounting and play of the auxiliary plate, D, which permits it to yield against the resistance of one or the other of its springs, S, according to the direction in which the primary plate is then oscillating. It will be readily understood that the force impelling the spindles, $b$, to enter the recesses, $r$, is the resistance of the valve itself, which is variable according to the conditions of pressure upon its back varying the frictional resistance of its face upon the valve seat. It will be further obvious, that, as the opposing force at the opposite end of the train of mechanism described, is one of the springs, S, we may regulate or vary the power of the springs so that when no pressure is upon the valve, the spring-force will exceed the resistance of the valve due to mere inertia or ordinary friction, and the plates, C, D, will operate in unison without intermovement and the function of the recessed slots, $s$, will be suspended for the time being, and the motion of the valve be entirely normal. This desirable condition we accomplish by employing springs of predetermined capacity, sufficient to hold the plates, C D, in relatively fixed contact, so that the slots, $s'$, of the auxiliary plate control the valve, whenever the engine is in motion without steam; but when the frictional resistance of the valve is increased by pressure of steam, the springs yield and permit the recessed slots, $s$, to govern the action of the valve. A further function of the springs, S, is to relieve the sudden contact of the spindles, $b$, with the bottom of the recesses, so as to prevent injury or noise, and also to aid thereafter in the accelerated movement of parts back again to normal position. In order to more efficiently accomplish these subsidiary results, we place in each socket of the brackets, $e$, a collar, $h$, threaded through the bottom of the sockets around the rod, $f$, and constituting in effect an adjustable bottom against which the spring S seats outwardly. By the adjustment of the collars $h$ the springs may be given more or less compression, and their effective force be thereby regulated as required. We may however substitute any of the well known applications of air as a cushion in lieu of springs.

In order to relieve the wear upon the inner walls of the sockets, $s$, and $s'$, we may place limiting stops $c'$, $c^2$, in the form of fixed studs projecting from the face of the primary plate, C, at successive distances from the central pivotal stud, $c$, engaging in apertures of the auxiliary plate, D. These apertures are slightly enlarged laterally to the required limits of movement so that the spindles, $b$, may not, in engaging against the bottoms of the recesses, $r$, cause or receive excessive wear, inasmuch as the studs, $c'$, $c^2$, will at the same time engage the sides of their apertures and limit the intermovement of the plate D, upon the plate, C. The effect is to engage the spindles, $b$, upon both plates, and thus preserve a contact bearing of double width. The studs, $c'$ and $c^2$, may also be provided with friction rollers or bushings of hardened steel, and to prevent access of dust or dirt in the apertures around the studs, $c, c', c^2$ we place a covering plate, $c^3$, over the ends of the studs, secured to the face of the plate, D.

As further provision against the wear of the slot-surface of the plate, C, we may provide facing rings, $i$, made of hardened steel around the margins of the slots as indicated in Figs. 3 and 8; and the same construction may, if necessary, be applied to the slots $s'$, of the plate, D.

As an incidental advantage growing out of our invention, we may mention the fact that by reason of the temporary retardation of the valve as described, its subsequent travel to the end of its stroke is accelerated, which results in a quicker opening for exhaust and also for admission of steam at the opposite stroke, thereby obtaining to some extent the economic advantages of the Corliss and other improved types, and rendering it practicable to operate the engine with even earlier cut-off than heretofore, consequently economizing the use of steam in this direction also.

While our invention is intended to be used with a link or other device for shortening the valve-stroke, and for the purpose of compensating the defects developed in such use, it may nevertheless be advantageously employed in engines where no link is used, solely to obtain a quick opening of the admission port and a correspondingly quick release.

We claim as our invention and desire to secure by Letters Patent of the United States—

1. In a slide-valve steam-engine, in combination with a reciprocating valve-rod, a rocker-arm connected below to the link in the usual manner, and extended above into a plate provided with curved slots having recesses as described, and engaging the valve-rod; as and for the purpose set forth.

2. In a slide-valve steam-engine, in combination with a valve-rod provided with spindles and reciprocating rectilineally, a rocker-arm-plate having curved and recessed slots engaging said spindles, in combination with an auxiliary rocker-arm-plate having similarly curved slots without recesses also engaging said spindles, and pivotally engaged with the main rocker-arm-plate, and means for producing and resisting a yielding movement of said auxiliary arm-plate in relation to the said main arm, substantially as set forth.

3. In a slide-valve steam engine, in combination with a compound rocker-arm, such substantially as described, engaging and reciprocating the valve; a system of opposing springs operating from the main rocker-arm as a fulcrum against its movable auxiliary to resist intermovement in either direction, substantially as set forth.

4. In a steam-engine the combination of a yoke-formed valve-stem, a rocker-arm consisting of main and auxiliary plates housed within said yoke, pins connecting opposite sides of the yoke through curved slots of the plates, and opposing springs seated upon the main rocker-arm-plate and bearing upon the auxiliary plate resisting its intermovement in either direction upon the main plate substantially as set forth.

5. In steam-engine valve mechanism, in combination with a link or other device for shortening the valve-stroke with a view of obtaining an earlier cut-off, a compensating device interposed between the link and the valve to retard the motion of the valve during its mid-stroke after cut-off so as to delay exhaust and opposite compression, substantially as set forth.

In testimony whereof we have hereunto set our hands in the presence of two subscribing witnesses.

JEPTHA GARRARD.
WILLIAM W. LEWIS.

Witnesses:
L. M. HOSEA,
LANDON FREYBLER.